US009554089B2

(12) United States Patent
Tang et al.

(10) Patent No.: US 9,554,089 B2
(45) Date of Patent: Jan. 24, 2017

(54) SMART LED LIGHTING DEVICE AND REMOTE VIDEO CHAT SYSTEM THEREOF

(71) Applicant: ZHEJIANG SHENGHUI LIGHTING CO., LTD, Jiaxing (CN)

(72) Inventors: Shumin Tang, Jiaxing (CN); Shuyu Cao, Jiaxing (CN); Jinxiang Shen, Jiaxing (CN)

(73) Assignee: ZHEJIANG SHENGHUI LIGHTING CO., LTD, Jiaxing (CN)

( * ) Notice: Subject to any disclaimer, the term of this patent is extended or adjusted under 35 U.S.C. 154(b) by 0 days.

(21) Appl. No.: 14/901,302

(22) PCT Filed: Apr. 28, 2015

(86) PCT No.: PCT/CN2015/077657
§ 371 (c)(1),
(2) Date: Dec. 28, 2015

(87) PCT Pub. No.: WO2016/015500
PCT Pub. Date: Feb. 4, 2016

(65) Prior Publication Data
US 2016/0212376 A1     Jul. 21, 2016

(30) Foreign Application Priority Data
Jul. 29, 2014    (CN) .......................... 2014 1 0366914

(51) Int. Cl.
*H04N 7/14*    (2006.01)
*H04L 12/18*   (2006.01)
(Continued)

(52) U.S. Cl.
CPC ........... *H04N 7/147* (2013.01); *F21V 33/0052* (2013.01); *G06F 3/16* (2013.01);
(Continued)

(58) Field of Classification Search
CPC combination set(s) only.
See application file for complete search history.

(56) References Cited

U.S. PATENT DOCUMENTS

| 2007/0085702 | A1* | 4/2007 | Walters | ................. | G06Q 30/04 |
|---|---|---|---|---|---|
| | | | | | 340/870.02 |
| 2009/0033504 | A1* | 2/2009 | Tsai | ........................ | G08B 3/10 |
| | | | | | 340/584 |

(Continued)

FOREIGN PATENT DOCUMENTS

| CN | 202040636 U | 11/2011 |
|---|---|---|
| CN | 202266962 U | 6/2012 |

(Continued)

OTHER PUBLICATIONS

The World Intellectual Property Organization (WIPO) International Search Report for PCT/CN2015/077657 Aug. 3, 2015.

*Primary Examiner* — Joseph J Nguyen
(74) *Attorney, Agent, or Firm* — Anova Law Group, PLLC

(57) ABSTRACT

The present disclosure provides smart LED lighting devices and remote video chat systems thereof. A smart LED lighting device includes an LED light-emitting unit, a power supply unit, a wireless communication unit, an audio and video processing and controller unit, a projection unit, a video acquisition unit, a voice input unit, and a voice broadcast unit. The audio and video processing and controller unit receives, parses, and processes audio and video information from the wireless communication unit, the voice input unit, and the video acquisition unit. The projection unit projects the processed video data in projectable format to a screen. The voice broadcast unit plays the processed audio information. The disclosed devices and systems can play audio and video resources from local terminal or the cloud in the Internet, perform remote video chat freely, and inte- (Continued)

grate with indoor environment, enhancing the smart home life experience.

18 Claims, 3 Drawing Sheets

(51) Int. Cl.
    *H04N 5/74*         (2006.01)
    *F21V 33/00*       (2006.01)
    *G06F 3/16*         (2006.01)
    *H04N 9/31*        (2006.01)
    *F21Y 101/00*     (2016.01)

(52) U.S. Cl.
    CPC ............... *H04L 12/18* (2013.01); *H04N 5/74* (2013.01); *H04N 7/142* (2013.01); *H04N 7/148* (2013.01); *H04N 9/3179* (2013.01); *F21Y 2101/00* (2013.01); *H04N 2007/145* (2013.01)

(56) References Cited

U.S. PATENT DOCUMENTS

| | | | |
|---|---|---|---|
| 2013/0044488 A1* | 2/2013 | Hreish | F21V 33/00 362/253 |
| 2014/0044488 A1 | 2/2014 | Critsinelis et al. | |

FOREIGN PATENT DOCUMENTS

| | | |
|---|---|---|
| CN | 104154439 A | 11/2014 |
| CN | 204005384 U | 12/2014 |

\* cited by examiner

SMART LED LIGHTING DEVICE AND REMOTE VIDEO CHAT SYSTEM THEREOF

CROSS-REFERENCES TO RELATED APPLICATIONS

This application is a national phase entry under 35 USC §371(c) of PCT Application No. PCT/CN2015/077657, filed on Apr. 28, 2015, which claims the priority of Chinese Patent Application No. 201410366914.X, filed on Jul. 29, 2014, the entire contents of all of which are incorporated herein by reference.

FIELD OF THE DISCLOSURE

The present disclosure relates to the field of lighting emitting device (LED) lighting technologies and, more particularly, relates to a smart LED lighting device and a remote video chat system using the smart LED lighting device.

BACKGROUND

LED (Light Emitting Diode) is a solid state semiconductor device that can directly convert electrical energy to visible light. LED technologies provide many advantages in energy conservation, environmental protection, controllable lighting, strong practicability, high stability, short response time, long operational lifetime, etc. To promote low carbon life style, LED technologies have been widely adopted in various lighting applications. LED lighting leads the development trend with high efficiency and environmental friendly lighting. The unique power supply and control method allow an easy integration of the LEDs with various intelligent controls and multimedia functions.

Nowadays, people often have remote video chat by computers or smart phones that include a webcam with related applications installed. Using a computer requires an external speaker and other devices so that people cannot move freely while chatting. When using a smart phone, due to the limitations of battery life, it is not convenient to video chat for a long period of time. Further, due to screen size limitations of the computers and cell phones, big screen video-chatting experience is not available.

LED lighting devices can be placed at various locations in a home environment. However, an LED lighting device merely for providing general lighting functions may not satisfy the needs of a smart home environment. To further promote smart applications of LED lighting devices to be integrated with smart home environment, and to bring new smart life experience to users, it is necessary to provide a smart LED lighting device with a related remote video chat system.

The disclosed method and system are directed to solve one or more problems set forth above and other problems.

BRIEF SUMMARY OF THE DISCLOSURE

The objective of the present disclosure is to provide a smart LED lighting device and a remote video chat system thereof, which are small, aesthetic, compact, easy to move, able to video chat freely, and capable of being integrated into indoor home environment.

One aspect of the present disclosure provides a smart LED lighting device, including an LED light-emitting unit and a power supply unit. The power supply unit is configured to drive the LED light-emitting unit and to provide power to the entire smart LED lighting device. The LED lighting device may further include an audio and video processing and controller unit. A wireless communication unit, a projection unit, a video acquisition unit, a voice input unit and a voice broadcast unit may also be included in the smart LED lighting device and are respectively connected with the audio and video processing and controller unit. The voice input unit may be configured to collect and obtain local voice information. The video acquisition unit may be configured to collect and obtain local video information. The wireless communication unit may be configured to receive remote audio and video information and to send out the local audio and video information. The audio and video processing and controller unit may receive the audio and video information from the wireless communication unit, and send the parsed and processed audio and video information to the projection unit and the voice broadcast unit respectively. The audio and video processing and controller unit may also receive the audio and video information from the voice input unit and the video acquisition unit, and send out the parsed and processed audio and video information through the wireless communication unit. The projection unit may process the processed video information from the audio and video processing and controller unit, produce corresponding video data in a projectable format and project to a screen. The voice broadcast unit may process and broadcast the processed audio information from the audio and video processing and controller unit.

Another aspect of the present disclosure provides a remote video chat system. The remote video chat system includes at least two smart LED lighting devices. Each smart LED lighting device includes an LED light-emitting unit, a wireless communication unit, a projection unit, a video acquisition unit, a voice input unit, and a voice broadcast unit. Each smart LED lighting device is configured to locally collect audio and video information of a local user using the voice input unit and the video acquisition unit. The wireless communication unit of each LED lighting device is respectively connected to the Internet and is configured to transmit the audio and video information of the local user to a remote user, and is also configured to receive audio and video information from the remote user. The received audio information is played by the voice broadcast unit of a corresponding smart LED lighting device, and the received video information is projected by the projection unit of the corresponding smart LED lighting device, enabling remote video chat.

Another aspect of the present disclosure provides a remote video chat system. The remote video chat system includes a smart LED lighting device, and a mobile terminal capable of inputting and outputting audio and video information and wirelessly connected to the smart LED lighting device. The smart LED lighting device is configured to locally collect first audio and video information of an LED user to send to the mobile terminal. The mobile terminal is configured to receive and play the first audio and video information of the LED user, to collect second audio and video information of a mobile terminal user, and to send the second audio and video information to the smart LED lighting device. The smart LED lighting device is configured to receive and process the second audio and video information from the mobile terminal, and to play the second audio and video information using a projection unit and a voice broadcast unit configured in the smart LED lighting device, enabling the remote video chat. This situation is applicable when one end is using a smart LED lighting device, while the other end is using a mobile terminal for video chat.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

The present disclosure provides a smart LED lighting device having large-screen video projection and voice talk capabilities, in addition to having general LED lighting functions. Regardless of being indoor or outdoor, whether at home or in an office, as long as an area is covered by the smart LED lighting device, wireless remote video chat and/or video playing, locally or via the Internet, can be realized.

Figure 1:
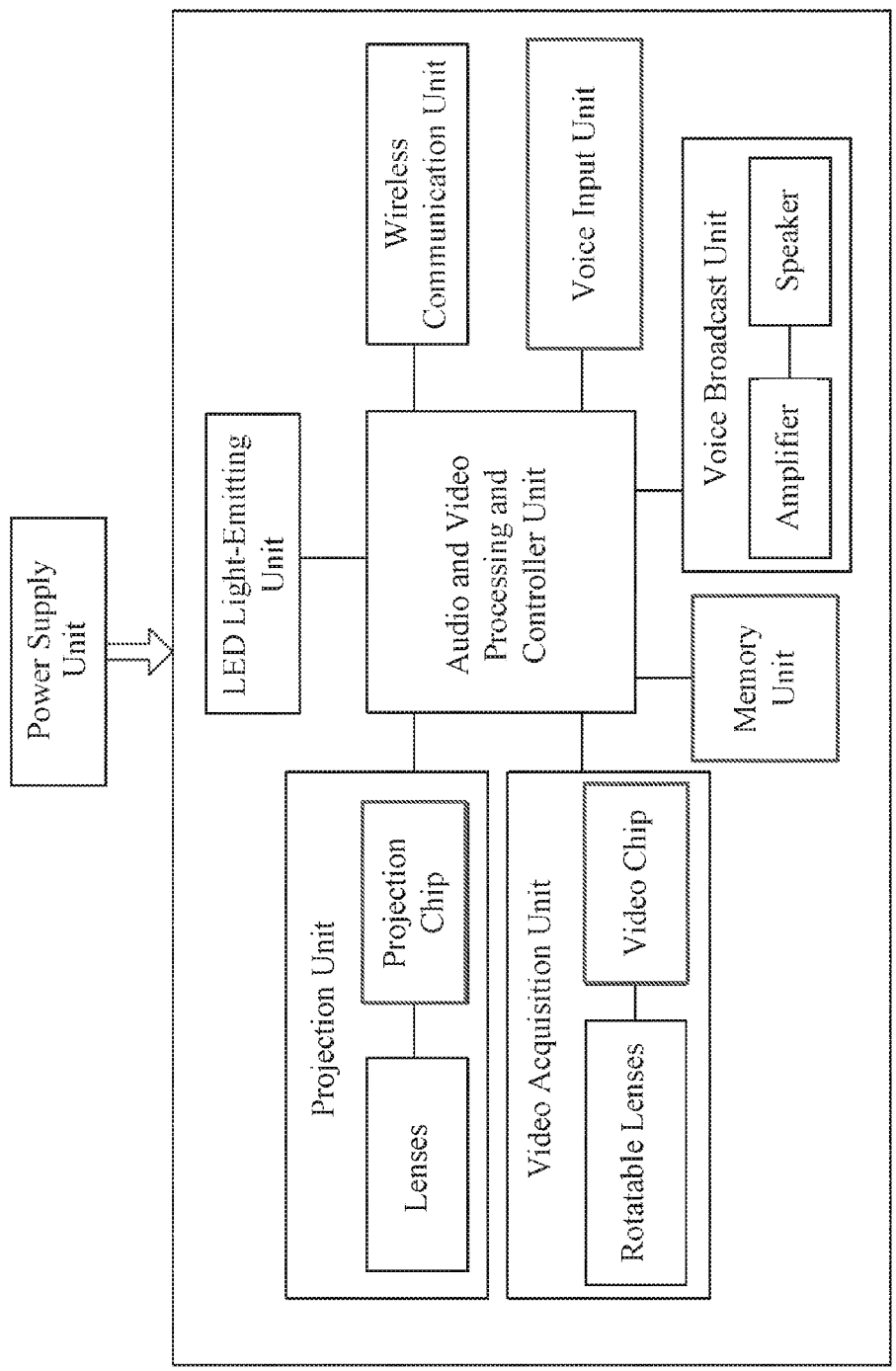
FIG. 1 is a structure diagram illustrating an exemplary smart LED lighting device consistent with the present disclosure.

Specifically, as shown in FIG. 1, the disclosed smart LED lighting device may include an LED light-emitting unit, a power supply unit, a wireless communication unit, an audio and video processing and controller unit, a projection unit, a video acquisition unit, a voice input unit and/or a voice output/broadcast unit. The wireless communication unit, the projection unit, the video acquisition unit, the voice input unit and the voice broadcast unit are connected to the audio and video processing and controller unit respectively.

The power supply unit may be an AC (alternating current) power supply, to drive the LED light-emitting unit and to provide power to the entire smart LED lighting device. The voice input unit is configured to collect and obtain voice information. In one embodiment, the voice input unit may be a microphone integrated within a lamp of the smart LED lighting device.

The video acquisition unit is configured to collect and obtain video information. The video acquisition unit may further include a video chip and rotatable lenses. The rotatable lenses may be configured to rotate freely to obtain the video information of a user from any desired directions. The video chip may parse and process the collected video information, and send processed video information to the audio and video processing and controller unit.

The wireless communication unit may be a WI-FI communication unit, a radio frequency (RF) unit, or a Bluetooth unit. The RF unit may adopt 2.4G or 5G WI-FI technology, or adopt 2.5G, 3G or 4G mobile wireless communication technology. The RF unit may use own antenna to receive and transmit the audio and video information.

The audio and video processing and controller unit may receive audio and video information from the wireless communication unit, and send the processed audio and video information to the voice broadcast unit and the projection unit respectively. The audio and video processing and controller unit may be integrated on one chip, or may be formed by combining an audio and video processing chip and a controller chip. Further, the operating system of the audio and video processing and controller unit may be android, Linux or ISO (International Organization for Standardization).

Further, the audio and video processing and controller unit may receive audio and video information from the wireless communication unit, and send the parsed and processed audio and video information to the voice broadcast unit and the projection unit respectively. Meanwhile, the audio and video processing and controller unit may receive, parse, and process audio and video information from the voice input unit and the video acquisition unit, and send out the parsed and processed audio and video information through the wireless communication unit.

Preferably, the disclosed smart LED lighting device may further include a memory unit. The memory unit may connect to the audio and video processing and controller unit, and is configured to buffer and store local or remotely received audio and video information.

In addition, the audio and video processing and controller unit may send instructions to the power supply unit to adjust the emitted light of the smart LED lighting device, including adjusting brightness, color and color temperature. For example, a user, through a control application, may change the brightness of the smart LED lighting device to achieve a desired lighting for presenting a desired self image to a chatting partner of the user. Moreover, adjusting the color and the color temperature of the smart LED lighting device may create different visual effects during the video chat. The users may also use certain applications to change the background light according to their moods or preferences. Furthermore, when a user starts to play music during the video chat, the audio and video processing and controller unit may instruct the power supply unit to generate and output different pulse-width modulation (PWM) or pulse-frequency modulation (PFM) light-adjusting signals according to the music. Therefore, the lighting atmosphere may change according to music style. For example, the LED lighting device may flash or change color in accordance with beats of the music. The lighting outputted from the LED light device may be controlled according to or independently from the music being played and/or the chatting condition.

The projection unit may process the processed video information from the audio and video processing and controller unit, produce corresponding video data in a projectable format and project to a screen. The projection unit may include a projection chip and lenses. The projection chip may parse received video information, and generate corresponding video data in a projectable format. The lenses may be configured to perform optical processing and to project the video data in a projectable format to the screen. Preferably, the screen may be a projection screen fabric that commonly used in offices, a white wall or a wall coated with projection paint. Alternatively, the data may be projected to a retina by retinal image display technology.

The voice broadcast unit may process and broadcast the processed audio information from the audio and video processing and controller unit. Further, the audio broadcast unit may include an amplifier and a speaker. The amplifier may amplify the received audio information and drive the speaker to play the amplified audio information.

In one embodiment, the voice input unit may be a Bluetooth microphone. The voice broadcast unit may be Bluetooth headphones or Bluetooth earphones. In addition, the voice input unit and the voice broadcast unit may be a Bluetooth headset that integrates a Bluetooth microphone and Bluetooth headphones. The Bluetooth microphone, the Bluetooth headset or the Bluetooth earphones may connect to the audio and video processing and controller unit via Bluetooth communication. By adopting Bluetooth earphones and microphone, voice collection and voice broadcast is very convenient. Further, other people will not be disturbed by the broadcasting sound, bringing more choices to the users.

In another embodiment, the voice input unit may be a microphone integrated into, e.g., within a lamp of, the smart LED lighting device. The voice broadcast unit may be a speaker/sound box integrated into, e.g., within a lamp of, the smart LED lighting device. Such configuration may collect voices from multiple people in the room, and the broadcasting sound may be heard by everyone in the room. Such configuration may apply to a group chat for multiple people in a same room or space.

Figure 2:
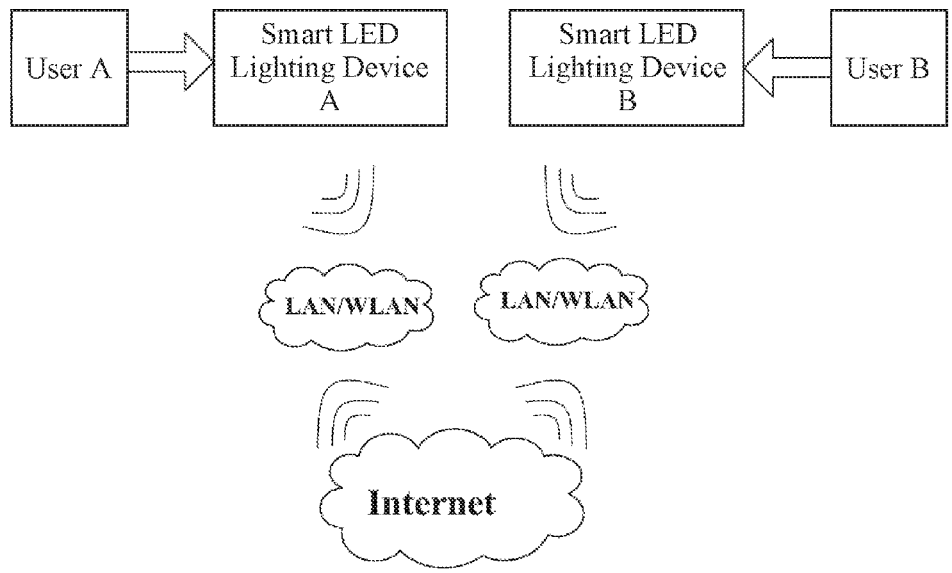
FIG. 2 is a structure diagram illustrating an exemplary remote video chat system in a first exemplary embodiment consistent with the present disclosure.

As shown in FIG. 2, a first exemplary embodiment of the present disclosure provides a remote video chat system, including smart LED lighting devices such as a smart LED lighting device A and a smart LED lighting device B, which are respectively located in different areas or rooms.

The wireless communication unit of the smart LED lighting devices may connect to the Internet by a wired network or a wireless network (LAN/WLAN), preferably by a wireless network. The smart LED lighting devices may remotely connect to each other via the Internet. The smart LED lighting device A and the smart LED lighting device B may respectively collect audio and video information of local user(s) A and local user(s) B through the voice input unit and the video acquisition unit.

The wireless communication unit of the smart LED lighting device A may transmit the processed audio and video information to the remote smart LED lighting device B which is connected to the Internet; and meanwhile, receive the audio and video information of user B from the smart LED lighting device B, and play the received audio and video information through the projection unit and the voice broadcast unit of the smart LED lighting device A.

The smart LED lighting device B may receive the audio and video information of user A from the smart LED lighting device A, and play the received audio and video information through the projection unit and the voice broadcast unit of the smart LED lighting device B. Therefore, user A and user B may perform real-time remote video chat.

Understandably, the disclosed system may include two or more smart LED lighting devices, and according to practical situations, a certain number of smart LED lighting devices may be configured. All smart LED lighting devices may be connected to each other to perform a remote video chat.

Figure 3:
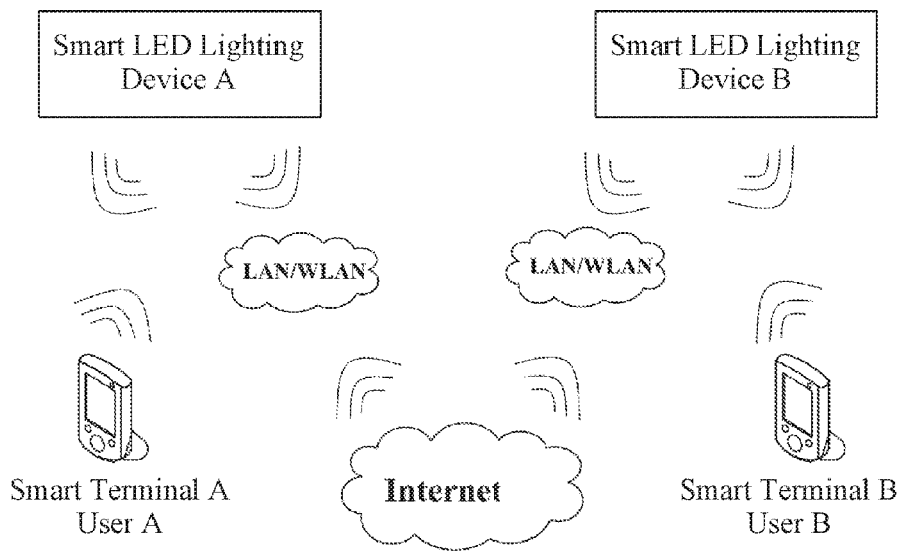
FIG. 3 is a structure diagram illustrating an exemplary remote video chat system in a second exemplary embodiment consistent with the present disclosure.

As shown in FIG. 3, based on the embodiment shown in FIG. 2, a second exemplary embodiment of the present disclosure may further include a mobile terminal A and a mobile terminal B, both having wireless communication capabilities. The wireless communication units of the smart LED lighting device A and the smart LED lighting device B may provide a wireless access point (AP) with relay function. The mobile terminal A and B may wirelessly connect to the wireless access point of the corresponding wireless communication unit in the smart LED lighting device A and B, thereby connecting to the smart LED lighting devices. User A and User B may send control instructions to the smart LED lighting devices through the mobile terminal A and B respectively.

Specifically, the mobile terminals may be installed with an APP (Application). The APP may provide the mobile terminal with a control interface for the connected smart LED lighting device. The APP may run in an operating system which is the same as the operating system of the smart LED lighting devices. The operating system may be Android, LINUX or ISO. Preferably, the mobile terminal may be any terminal having wireless communication capabilities, such as a tablet computer, a PDA (Personal Digital Assistant), a cell phone, a laptop computer, or a personal computer.

Figure 4:
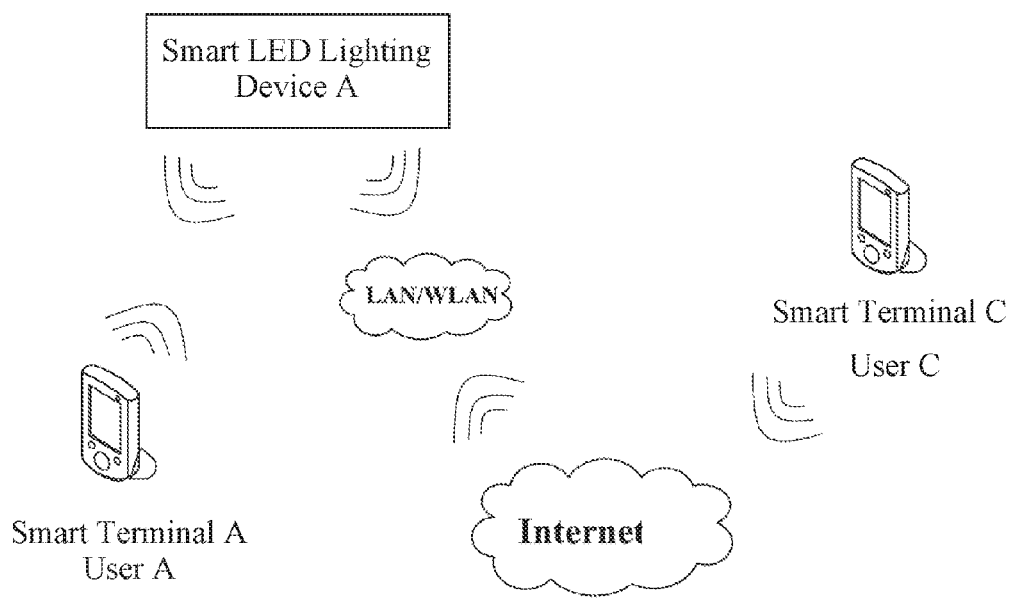
FIG. 4 is a structure diagram illustrating an exemplary remote video chat system in a third exemplary embodiment consistent with the present disclosure.

As shown in FIG. 4, a third exemplary embodiment of the present disclosure may include a smart LED lighting device A, a mobile terminal A having wireless communication capabilities and a mobile terminal C. The mobile terminal C may perform functions including audio and video information input and output, and wireless communication.

The smart LED lighting device A and the mobile terminal C may connect to the Internet respectively. The mobile terminal A may wirelessly connect to the smart LED lighting device A. User A may send control instructions to the smart LED lighting device A through the mobile terminal A. Similarly, the mobile terminal A may be installed with an APP. The APP may provide a control interface of the connected smart LED lighting device A. The APP may run in an operating system same as the operating system of the smart LED lighting device A, which may be Android, LINUX or ISO.

The smart LED lighting device A may collect audio and video information of local user A, and send to the mobile terminal C via the Internet. The mobile terminal C may play the received audio and video information, meanwhile collect audio and video information of user C, and send to the smart LED lighting device A via the Internet. The smart LED lighting device A may receive the audio and video information from the mobile terminal C, and play the received information through the projection unit and the voice broadcast unit, therefore enabling remote video chat.

In certain embodiments, the smart LED lighting device may function as an audio and video playing system. The wireless communication unit of the smart LED lighting device may provide a wireless access point, wirelessly connecting the wireless communication unit to the Internet. Therefore, the smart LED lighting device may receive or download video resources from the Internet, and play the resources through the projection unit and the voice broadcast unit.

In addition, the smart LED lighting device may wirelessly connect to a mobile terminal installed with a corresponding APP. By operating the audio and video chat APP on the mobile terminal, users may control the smart LED lighting device to play video resources from the mobile terminal or from the cloud on the Internet. The wireless communication unit may receive audio and video information through an antenna. The audio and video information processing and controller unit may receive the audio and video information from the wireless communication unit, and send the parsed and processed audio and video information to the projection unit and the voice broadcast unit respectively, so that users may enjoy listening to audios or watching movies and videos.

In certain embodiments, the smart LED lighting device is an LED smart light, such as a PAR (Parabolic Aluminum Reflector) light, a ceiling light, a table light, etc. The LED smart light may be installed for projections in offices or at home. The installation method and location are not limited. The LED smart light may be installed at any location that requires lights, such as indoor lights, or outdoor lights, and industrial lights, home lights or public lights. The smart LED lighting device may further include an infrared transceiver unit. Wireless technology and infrared technology may both be used for the disclosed smart LED light devices. The wireless communication unit may be used for transmissions of audio and video information and other data. The infrared technology may be configured to send and receive control instructions from the APP in the mobile terminal.

As such, various embodiments provide an exemplary remote video chat system. The remote video chat system includes at least two smart LED lighting devices. Each smart LED lighting device can include an LED light-emitting unit, a wireless communication unit, a projection unit, a video acquisition unit, a voice input unit, and a voice broadcast unit. Each smart LED lighting device is configured to locally collect audio and video information of a local user using the voice input unit and the video acquisition unit. The wireless communication unit of each LED lighting device is respectively connected to the Internet and is configured to transmit the audio and video information of the local user to a remote user, and is also configured to receive audio and video information from the remote user. The received audio information is played by the voice broadcast unit of a corresponding smart LED lighting device, and the received video information is projected by the projection unit of the corresponding smart LED lighting device, enabling remote video chat.

The remote video chat system may further include at least two mobile terminals configured to have wireless communication capabilities and to send control instructions to the at least two smart LED lighting devices. The wireless communication unit of the smart LED lighting device provides a wireless access point with relay function. The mobile terminals wirelessly connect to the wireless communication units of the at least two smart LED lighting devices respectively, enabling wireless connection to the smart LED lighting devices.

For example, each mobile terminal is installed with an application configured to provide an interface for controlling one of the at least two smart LED lighting devices.

Each smart LED lighting device further includes an audio and video processing and controller unit configured to instruct a power supply unit to adjust the emitted light of each smart LED lighting device, such that a brightness, a color, and a color temperature of the emitted light of the smart LED lighting device are adjusted, according to user preferences, and/or to create different visual effects during the remote video chat.

For example, each smart LED lighting device is further configured to generate pulse-width modulation (PWM) or pulse-frequency modulation (PFM) light-adjusting signals according to music, when the music is played during a remote video chat session.

Various embodiments further provide an exemplary remote video chat system. The remote video chat system can include a smart LED lighting device, and a mobile terminal capable of inputting and outputting audio and video information and wirelessly connected to the smart LED lighting device. The smart LED lighting device is configured to locally collect first audio and video information of an LED user to send to the mobile terminal. The mobile terminal is configured to receive and play the first audio and video information of the LED user, to collect second audio and video information of a mobile terminal user, and to send the second audio and video information to the smart LED lighting device. The smart LED lighting device is configured to receive and process the second audio and video information from the mobile terminal, and to play the second audio and video information using a projection unit and a voice broadcast unit configured in the smart LED lighting device, enabling the remote video chat.

For example, the mobile terminal may be a tablet computer, a smart phone, or a laptop computer. The smart LED lighting device includes a voice input unit configured to locally collect and obtain first audio information, a video acquisition unit configured to locally collect and obtain first video information, a wireless communication unit configured to receive the second audio and video information and to send out the first audio and video information, and an audio and video processing and controller unit respectively connected to each of the voice input unit, the video acquisition unit, the wireless communication unit, the projection unit, and the voice broadcast unit.

The audio and video processing and controller unit of the smart LED lighting device is configured to receive, parse, and process the second audio and video information from the wireless communication unit from the mobile terminal, and to send the parsed and processed second audio and video information to the voice broadcast unit and the projection unit respectively. The audio and video processing and controller unit is further configured to receive, parse, and process the first audio information and the first video information from the voice input unit and the video acquisition unit respectively, and to send out the parsed and processed first local audio and video information through the wireless communication unit to the mobile terminal.

The projection unit of the smart LED lighting device is configured to process the parsed and processed second video information from the audio and video processing and controller unit, to produce a video data in a projectable format, and to project the video data to a screen. The voice broadcast unit of the smart LED lighting device is configured to process and broadcast the parsed and processed second audio information from the audio and video processing and controller unit.

In some embodiments, one remote video chat system may include multiple smart LED lighting devices. By the control of a smart terminal or mobile terminal, each smart LED lighting device may be used to accommodate various user needs. For example, a remote video chat may have users from two remote sites on the same audio/video chat. The user(s) from site A may choose to attend the chat by video. The user(s) from site B may choose to attend the chat by audio. The smart LED lighting device at site A may thus control the emitted light to facilitate the remote chat (e.g., dimming or varying the light in certain situations). The smart LED lighting device at site B may control the emitted light to better facilitate audio effect. In addition, lighting for sites A and B may be independently controlled.

In some embodiments, the smart LED lighting device may include one or more sensors for detecting objects or movements of objects in the room when chatting. The sensor(s) may be connected to the audio and video processing and controller unit, the voice input unit, and/or video acquisition unit based on the data received from the sensors. For example, when users are in a room with the smart LED lighting device for chatting, the sensors integrated in this smart LED lighting device may detect the position and movements of the speaker in the users. The smart LED lighting device may then adjust the voice input unit and/or the video acquisition unit to be close (or closest) to the speaker to better pick up the speech and images, and adjust the voice input unit and/or the video acquisition unit to be far away from the speaker to reduce the background noise for the chatting.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

The disclosed smart LED lighting device and remote video chat system thereof provide and integrate an RF unit, an audio and video processing and controller unit, a projection unit, an audio acquisition unit, a voice broadcast unit and/or a voice input unit into a single LED lighting device without affecting appearance and size of, e.g., the lamp of the LED lighting device. Also the LED lighting output is not affected. In the meantime, local and remote audio and video information may be obtained and transmitted simultaneously, and the obtained audio and video information may be played locally by the smart LED lighting device, therefore enabling remote video chat. Meanwhile, video resources from local terminal or the cloud in the Internet may be played, so that TVs and IPTV set-top boxes may be replaced by LED lighting devices in a desired configuration at home.

The disclosed smart LED lighting device is compact and artistic, and can be placed at various locations in the home environment, integrating into the indoor furniture environment. The disclosed smart LED lighting device and remote video chat system thereof may provide power supply by the power supply unit of the LED lighting device, without requiring extra battery or power adapter. For example, compared with traditional video chat on smart mobile terminals, the challenge of limiting power consumption can be addressed. In another example, external cables for projection displays, such as AV cable, VGA cable or HDMI cable, speakers and microphones are not needed either. Installation just requires existing LED assembly holes. Compared with traditional smart terminals for video chat, the disclosed device is mobile, convenient and easy to operate, allowing users to perform remote video chat freely, therefore enhancing the smart home life experience.

What is claimed is:

1. A smart LED lighting device, comprising:
    an LED light-emitting unit;
    a power supply unit configured to drive the LED light-emitting unit and to provide power to the entire smart LED lighting device;
    an audio and video processing and controller unit;
    a voice input unit configured to collect and obtain local audio information;
    a video acquisition unit configured to collect and obtain local video information;
    a wireless communication unit configured to receive remote audio and video information and to send out the local audio and video information;
    a projection unit, and
    a voice broadcast unit;
    wherein:
        the wireless communication unit, the projection unit, the video acquisition unit, the voice input unit and the voice broadcast unit are connected to the audio and video processing and controller unit respectively;
        the audio and video processing and controller unit is configured to receive, parse and process the remote audio and video information from the wireless communication unit, and to send the parsed and processed remote audio and video information to the voice broadcast unit and the projection unit respectively;
        the audio and video processing and controller unit is further configured to receive, parse, and process the local audio information and the local video information from the voice input unit and the video acquisition unit respectively, and send out the parsed and processed local audio and video information through the wireless communication unit;
        the projection unit is configured to process the parsed and processed remote video information from the audio and video processing and controller unit, to produce a video data in a projectable format, and to project the video data to a screen; and
        the voice broadcast unit is configured to process and broadcast the parsed and processed remote audio information from the audio and video processing and controller unit.

2. The smart LED lighting device according to claim 1, further comprising: a memory unit configured to buffer and store audio and video information and connected to the audio and video processing and controller unit.

3. The smart LED lighting device according to claim 1, wherein:
    the projection unit includes a projection chip and lenses;
    the projection chip is configured to analyze the received remote video information, and to generate corresponding video data in a projectable format; and
    the lenses are configured to perform optical processing and to project the video data in the projectable format to the screen.

4. The smart LED lighting device according to claim 1, wherein:
    the video acquisition unit includes a video chip and rotatable lenses;
    the rotatable lenses are configured to rotate freely to collect the local video information of one or more users; and
    the video chip is configured to parse and process the collected local video information, and to send the processed local video information to the audio and video processing and controller unit.

5. The smart LED lighting device according to claim 1, wherein:
    the voice broadcast unit includes an amplifier and a speaker; and the amplifier is configured to amplify the received remote audio information and drive the speaker to play the amplified remote audio information.

6. The smart LED lighting device according to claim 1, wherein:
the voice input unit is a microphone integrated into the smart LED lighting device; and
the voice broadcast unit is a speaker integrated into the smart LED lighting device.

7. The smart LED lighting device according to claim 1, wherein:
the voice input unit is a Bluetooth microphone independent from the smart LED lighting device;
the voice broadcast unit is a Bluetooth headset or Bluetooth earphones independent from the smart LED lighting device; and
the voice input unit and the voice broadcast unit respectively connect to the audio and video processing and controller unit via Bluetooth communication.

8. The smart LED lighting device according to claim 1, wherein the wireless communication unit is a WI-FI communication unit, a radio frequency (RF) unit, or a Bluetooth unit.

9. The smart LED lighting device according to claim 8, wherein the wireless communication unit is an RF unit configured to adopt 2.4G or 5G WI-FI technology, or to adopt 2.5G, 3G or 4G mobile wireless communication technology.

10. The smart LED lighting device according to claim 1, wherein each unit of the smart LED lighting device is configured within a lamp of the smart LED lighting device as a single device.

11. The smart LED lighting device according to claim 1, wherein an operating system of the audio and video processing and controller unit is Android, Linux or ISO.

12. A remote video chat system, comprising:
at least two smart LED lighting devices, each including an LED light-emitting unit, a wireless communication unit, a projection unit, a video acquisition unit, a voice input unit and a voice broadcast unit, wherein:
each smart LED lighting device is configured to locally collect audio and video information of a local user using the voice input unit and the video acquisition unit;
the wireless communication unit of each LED lighting device is respectively connected to the Internet and is configured to transmit the audio and video information of the local user to a remote user, and is also configured to receive audio and video information from the remote user; and
the received audio information is played by the voice broadcast unit of a corresponding smart LED lighting device, and the received video information is projected by the projection unit of the corresponding smart LED lighting device, enabling remote video chat, wherein in each smart LED lighting device:
the wireless communication unit, the projection unit, the video acquisition unit, the voice input unit and the voice broadcast unit are connected to the audio and video processing and controller unit respectively;
the audio and video processing and controller unit is configured to receive, parse and process the remote audio and video information from the wireless communication unit, and to send the parsed and processed remote audio and video information to the voice broadcast unit and the projection unit respectively;
the audio and video processing and controller unit is further configured to receive, parse, and process the local audio information and the local video information from the voice input unit and the video acquisition unit respectively, and send out the parsed and processed local audio and video information through the wireless communication unit;
the projection unit is configured to process the parsed and processed remote video information from the audio and video processing and controller unit, to produce a video data in a projectable format, and to project the video data to a screen; and
the voice broadcast unit is configured to process and broadcast the parsed and processed remote audio information from the audio and video processing and controller unit.

13. The remote video chat system according to claim 12, further comprising:
at least two mobile terminals configured to have wireless communication capabilities and to send control instructions to the at least two smart LED lighting devices, wherein:
the wireless communication unit of the smart LED lighting device provides a wireless access point with relay function; and
the mobile terminals wirelessly connect to the wireless communication units of the at least two smart LED lighting devices respectively, enabling wireless connection to the smart LED lighting devices.

14. The remote video chat system according to claim 13, wherein each mobile terminal is installed with an application configured to provide an interface for controlling one of the at least two smart LED lighting devices.

15. The remote video chat system according to claim 12, wherein:
each smart LED lighting device further includes an audio and video processing and controller unit configured to instruct a power supply unit to adjust an emitted light of each smart LED lighting device, such that a brightness, a color, and a color temperature of the emitted light of the smart LED lighting device are adjusted according to user preferences, to create different visual effects during the remote video chat.

16. The remote video chat system according to claim 15, wherein each smart LED lighting device is further configured to generate pulse-width modulation (PWM) or pulse-frequency modulation (PFM) light-adjusting signals according to a music, when the music being played during the remote video chat.

17. A remote video chat system, comprising:
a smart LED lighting device; and
a mobile terminal capable of inputting and outputting audio and video information and wirelessly connected to the smart LED lighting device, wherein:
the smart LED lighting device is configured to locally collect first audio and video information of an LED user to send to the mobile terminal,
the mobile terminal is configured to receive and play the first audio and video information of the LED user, to collect second audio and video information of a mobile terminal user, and to send the second audio and video information to the smart LED lighting device; and
the smart LED lighting device is configured to receive and process the second audio and video information from the mobile terminal, and to play the second audio and video information using a projection unit and a voice broadcast unit configured in the smart LED lighting device, enabling the remote video chat, wherein the mobile terminal is a tablet computer, a smart phone, or a laptop computer and the smart LED lighting device comprises:

a voice input unit configured to locally collect and obtain first audio information;

a video acquisition unit configured to locally collect and obtain first video information;

a wireless communication unit configured to receive the second audio and video information and to send out the first audio and video information; and an audio and video processing and controller unit respectively connected to each of the voice input unit, the video acquisition unit, the wireless communication unit, the projection unit, and the voice broadcast unit.

18. The remote video chat system according to claim 17, wherein:

the audio and video processing and controller unit is configured to receive, parse, and process the second audio and video information from the wireless communication unit from the mobile terminal, and to send the parsed and processed second audio and video information to the voice broadcast unit and the projection unit respectively;

the audio and video processing and controller unit is further configured to receive, parse, and process the first audio information and the first video information from the voice input unit and the video acquisition unit respectively, and to send out the parsed and processed first local audio and video information through the wireless communication unit to the mobile terminal;

the projection unit is configured to process the parsed and processed second video information from the audio and video processing and controller unit, to produce a video data in a projectable format, and to project the video data to a screen; and the voice broadcast unit is configured to process and broadcast the parsed and processed second audio information from the audio and video processing and controller unit.

* * * * *